CIPHER TELEGRAPH SYSTEM

Filed Feb. 17, 1961

3 Sheets-Sheet 1

INVENTOR
Pierre R. Berjon
BY
Pennie, Edmonds, Morton, Barrows & Taylor
ATTORNEYS INVENTOR
Pierre R. Berjon
BY
Pennie Edmonds Morton
Barrows & Taylor
ATTORNEYS May 25, 1965 P. R. BERJON 3,185,765

CIPHER TELEGRAPH SYSTEM

Filed Feb. 17, 1961 3 Sheets-Sheet 3

INVENTOR
Pierre R. Berjon
BY
Pennie Edmonds Morton Barrows & Taylor
ATTORNEYS 3,185,765

CIPHER TELEGRAPH SYSTEM

Pierre R. Berjon, La Celle-Saint-Cloud, France, assignor to Societe d'Applications Generales d'Electricite et de Mecanique, Paris, France, a French company Filed Feb. 17, 1961, Ser. No. 90,118
Claims priority, application France, Feb. 18, 1960, 818,946
4 Claims. (Cl. 178—22)

The present invention relates to a system of ciphered telegraphic communication incorporating "on the line" ciphering and particularly to such a system in which transmission is effected with a single conductor, a single transmission line or other channel provided for each direction of transmission.

Enciphering and deciphering of telegraphic intelligence may be effected at two different locations in the channel between the message originator and the recipient. According to one method, called "enciphering off the line," the enciphering (hereinafter simply "ciphering") and deciphering are independent of the system of telegraphic transmission employed, that system effecting only transmission of messages previously ciphered and the reception of messages which have not been deciphered.

According to a second type of ciphered telegraphic communication, the ciphering and deciphering take place within the telegraphic system which connects the telegraph transmitter to the telegraph receiver. Such a system may be described as one of telegraphic transmission with ciphering "on the line." The ciphering and deciphering devices may be either of the internal key type, or they may employ ciphering tapes. It will be assumed hereinafter that the ciphering and deciphering devices employ ciphering tapes, but the means provided by the invention for the advancement and the maintenance of proper phase relation between the ciphering tapes at the transmitting and receiving stations may be applied without substantial change to those operations as applied to ciphering and deciphering devices of the internal key type.

It is an object of the invention to provide a system of secret telegraphic transmission having ciphering on the line, including means to maintain in phase the ciphering and deciphering tapes.

Another object of the invention is the provision of a system of telegraphic transmission employing ciphering on the line, which system includes means for verifying at the receiving station the phase relation between the ciphering and deciphering tapes, such verification to be effected at the start and at the end of each message, and, moreover, to restore phase concordance between these tapes by action effected simultaneously at both transmitting and receiving stations on the tape drive mechanism, if a phase error is observed between the two tapes.

It is known that the principal causes for loss of synchronism between the ciphering and deciphering devices in on the line ciphering systems reside in the appearance on the line of parasitic signals during the intervals between traffic. These parasitic impulses cause the deciphering tape to advance excessively at the receiving station. Additional causes reside in abnormal and temporary attenuation in the signal channel (particularly when it is of a wireless nature) which results in inadequate advance of the tape at the receiving station. Additionally, loss of synchronism is caused by errors in operation by operating personnel upon changeover from ciphered to plain language or "clear" transmission.

The first two causes of phase displacement are mitigated according to the invention by insertion onto the line of means for decoupling the deciphering apparatus except during times of ciphered transmission and by the provision of apparatus generating simulated start signals. The third of these causes is mitigated in effect by appropriate choice of the form of the ciphered messages to be transmitted.

It will be assumed hereinafter that a message to be transmitted in ciphered form is characterized by the inclusion of four groups of signals or characters, viz.:

(1) A first head-end message group comprising, for example, the group CCCC.

(2) An immediately succeeding second head-end message group which may, for example, comprise five spaces, two carriage returns and a line feed.

(3) At the end of the message, a first tail-end group comprising, for example, the group NNNN.

(4) An immediately succeeding second tail-end message group comprising, for example, character "LTRS" repeated eight times. Of course, the number of signals or characters in each group and the make-up of these groups in detail are matters within which a wide latitude of choice is possible consistently with the invention.

The invention will now be described in detail by reference to the annexed drawings in which.

Figure 1:
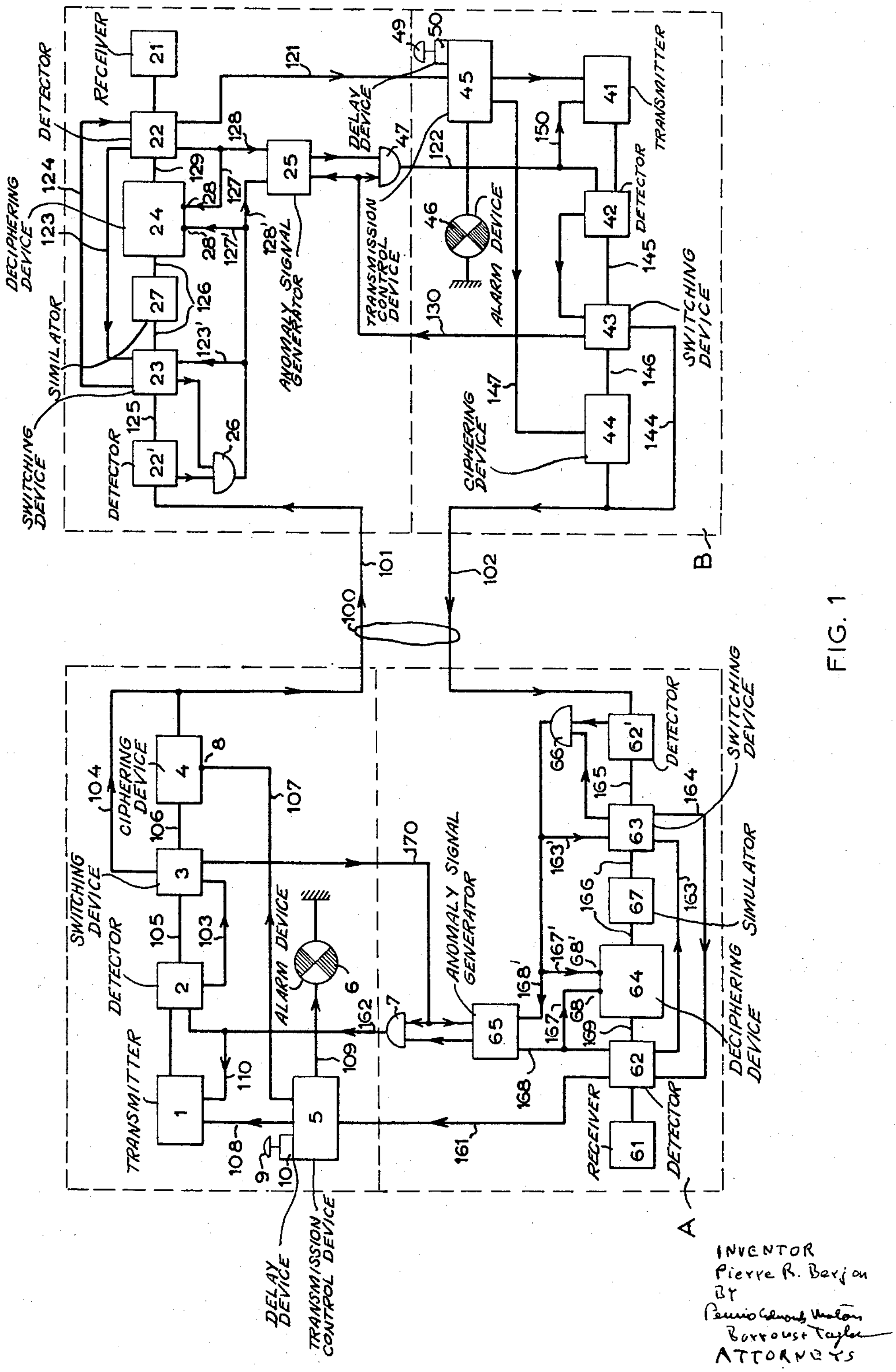
FIG. 1 is a block diagram of a telegraph system according to the invention.

Referring to FIG. 1, transmitting and receiving stations A and B are connected by a two-way channel 100 comprising a conductor 101 for transmission of telegraphic signals from A to B and by a conductor 102 for such transmission from B to A.

At A the transmitting apparatus comprises, in series on the transmitting conductor 101, an automatic telegraph signal transmitter 1, a signal group detector 2, a switching device 3, a ciphering device 4, a by-pass line 104 and an alarm signal device 6.

The switching device 3 is controlled by the detector 2 via line 103. This detector responds to first head-end and first tail-end groups characteristic of a message to be ciphered, i.e. to the combinations CCCC and NNNN in the example supposed. Upon receiving the first head-end group, it will set the switching device 3 to connect the line 105 with the ciphering device 4 via line 106. Upon receiving the first tail-end group, the detector causes the switching device 3 to connect the line 105 directly to the outgoing line 101 via the bypass 104.

The ciphering device 4 includes an input 8 which permits the signal for advancing the phase of the ciphering tape in device 4 to be advanced down to a reference mark on the tape, present in a manner to be hereinafter described in greater detail. Control on the amount of tape advance is effected via line 107 from the ciphered transmission control device 5.

This control device likewise controls the stopping and starting of the automatic transmitter 1 via line 108 and the actuation of the alarm signal device 6 by a line 109. Control device 5 can itself be actuated manually at a control 9, in which event its activation is delayed, for example, for a period of 10 seconds, for reasons to be explained presently, by a delay device 10 which may be mechanical in nature. Alternatively, the control device 5 may be actuated automatically from the line 161.

At the station B there is provided a receiver comprising, in series on the receiving conductor 101 an upstream or input received signal group detector 22', a switching device 23, a start signal simulator 27, a deciphering device 24, a bypass line 124 around device 24, a downstream or output received signal group detector 22, and a telegraph receiver 21. The group signal detectors 22 and 22′ control the switching device 23 via lines 123 and 123′ respectively. They likewise control the deciphering device 24 via lines 127 and 127′, and an anomaly signal transmitter 25 via the lines 128 and 128′.

As hereinabove already set forth, the start simulator 27 has the function of permitting step by step advance of the deciphering tape in the event of momentary decline in the level of the telegraph signals, even if such attenuation amounts to complete interruption. Start simulators are known in the art. They comprise a time base generator, means to actuate that generator for a cycle of given duration upon the reception of a start signal, means to determine the presence or absence of a subsequent start signal at the input to the simulator when the end of the cycle occurs, and means to produce a similar start signal at the output of the simulator if the subsequent start signal is absent.

The switching device 23 may possess two states, in the first of which it couples lines 125 and 126 via the start simulator 27 and in the second of which it couples the lines 125 and 124 for bypass purposes.

The signal group detector 22 is sensitive to the first head-end signal group CCCC, to the immediately following second head-end group (e.g., five spaces, two carriage returns and a line feed), to the first tail-end group NNNN, and to a so-called anomaly signal group WWWW. The detector 22 receives the group CCCC in clear over line 124. It then receives the second head-end signal group of five spaces, two carriage returns and a line feed in deciphered form via line 129. It also receives the group NNNN in deciphered form via line 129 and the group WWWW in clear via line 124. It is to be noted that the signal groups received in deciphered form will be received correctly, i.e. properly deciphered only in the absence of a phase error in the position of the deciphering tape of the device 24. This observation applies to the second head-end group of five spaces, two carriage returns and a line feed and to the first tail-end group NNNN. The detector 22 likewise receives in clear via line 124 the second tail-end group comprising eight "LTRS" characters, but it is not necessary for the detector 22 to be capable of detecting that group. Upon receiving the group CCCC the detector 22 effects a junction of lines 125 and 126 at switching device 23. Upon receiving the group NNNN, detector 22 effects conversely a junction of lines 124 and 125. In this way, the deciphering device is disconnected from the line 101 except during times of ciphered transmission.

The signal group detector 22′ responds to the group immediately following the first ciphered message tail-end group. It thus responds to the group comprising eight inverted letters. Upon receiving this group detector 22′ will, in the event only of a phase displacement of the tape of the deciphering device, effect a number of control functions hereinafter explained.

The deciphering device 24 includes two input terminals 28 and 28′ by means of which phase correction of the deciphering tape therein may be effected.

The transmitting apparatus at the station B and the receiving apparatus at the station A are respectively identical to the transmitting apparatus at station A and to the receiving apparatus at station B. The corresponding circuit elements have been identified in the drawings by the same reference characteristics increased by forty. It will be seen that the transmitting and receiving elements at station B are connected together via conductors 121, 122 and 130 and that the transmitting and receiving elements at station A are connected together by conductors 161, 162 and 170. The nature of these connections will be hereinafter described.

The passage of the first message head-end group into the group detector 2 at station A results in connection of the ciphering device 4 to the line 101.

The next succeeding group of signals is therefore transmitted in ciphered form. At the station B the first message head-end signal group CCCC is bypassed in clear via line 124 and is detected by the detector 22. This has the effect of coupling the line 101 to the deciphering device 24 via line 126. If there is no phase error in the position of the tape in device 24 the second message head-end signal group of five spaces, two carriage returns and a line feed (arriving in ciphered form) will be correctly deciphered and thereafter detected in the detector 22.

If there is a phase displacement between the tapes of the devices 4 and 24, the signal group comprising five spaces, two carriage returns and a line feed will not be received as such by the detector 22 whereupon the latter will send a control signal to the anomaly signal generator 25 via line 128 and additionally effect via line 127 restoration of correct phase or position of the deciphering tape in deciphering device 24.

Passage of the first message tail-end group NNNN into the detector 2 at station A effects disconnection of the ciphering device 4 from the line 101, and the following group of signals is transmitted in clear. At the receiving station the group NNNN will be correctly deciphered if there is no position or phase error of the tape of the device 24. The deciphered group NNNN is then transmitted to the detector 22 via line 129 and this has the effect of disconnecting the decoding device 24 from the line 101 by means of a signal passed over line 123. Consequently, still assuming lack of phase displacement, the next following clear group of eight characters is received in clear by the group signal detector 22 over the bypass connection 124.

However, as above stated, the group detector 22 does not need to be able to identify this group since it is received in plain language only if the preceding group NNNN was correctly decoded.

If there is a phase displacement between the coding and decoding tapes of the devices 4 and 24, the group NNNN will be incorrectly deciphered and device 24 will not be disconnected from the line. The following group (the character "LTRS" repeated eight times), although transmitted in clear, will be subjected to a deciphering operation and will thus be incorrectly deciphered. The detector 22 is incapable of detecting phase error at the end of the message.

The criterion for the existence of a phase error at the end of a message is consequently the reception and detection of the second tail-end group, comprising eight "LTRS" characters, by the signal group detector 22′ at a time when the switching device 23 connects the input 125 of switching unit 23 to the output 126. The detector 22′, upon receiving this group, sends via line 123′ a control signal to switch 23 through the AND gate 26, which is opened by a signal from that switch when the switch connects lines 125 and 126. Via gate 26 and line 128′, detector 22′ also sends a control signal to the anomaly signal transmitter 25. It also controls via line 127′ phase correction of the tape in decoding device 24. The anomaly transmitter 25 once set into operation continues to emit the characteristic signal group WWWW until a stop signal is supplied to it via line 130. Transmitters adapted to develop continuously a given signal between the arrival of start and stop signals are known in the art as automatic indicator transmitters.

The output of the transmitter 25 is connected to the input of the signal group detector 42 via an AND gate 47 which is opened via line 130 when switch 43 connects lines 145 and 144. When switch 43 connects lines 144 and 145, i.e., when the station B is either quiescent or transmitting in clear, the signal developed by the anomaly signal transmitter 25 is sent out in clear on the line 102, detected by the group signal detector 62 at A and applied by a line 161 to the control device 5. As above indicated, this device shuts off the automatic transmitter 1 via line 108 and initiates via line 107 a phase correction for the ciphering tape of the ciphering device 4, and lastly initiates an alarm signal at the line 109. The anomaly signal transmitter 25 is stopped via line 130. The automatic transmitter 41 is stopped during transmission of the anomaly signal via line 150.

Telegraphic signal group detectors are known in the art and are described, for example, in French Patent 1,230,611 filed April 3, 1959 in the names of Roger Sourgens and Raymond Chollet. Such a detector is shown in block diagram form in FIG. 2, a full description of the circuits being included in the patent just cited.

Figure 2:
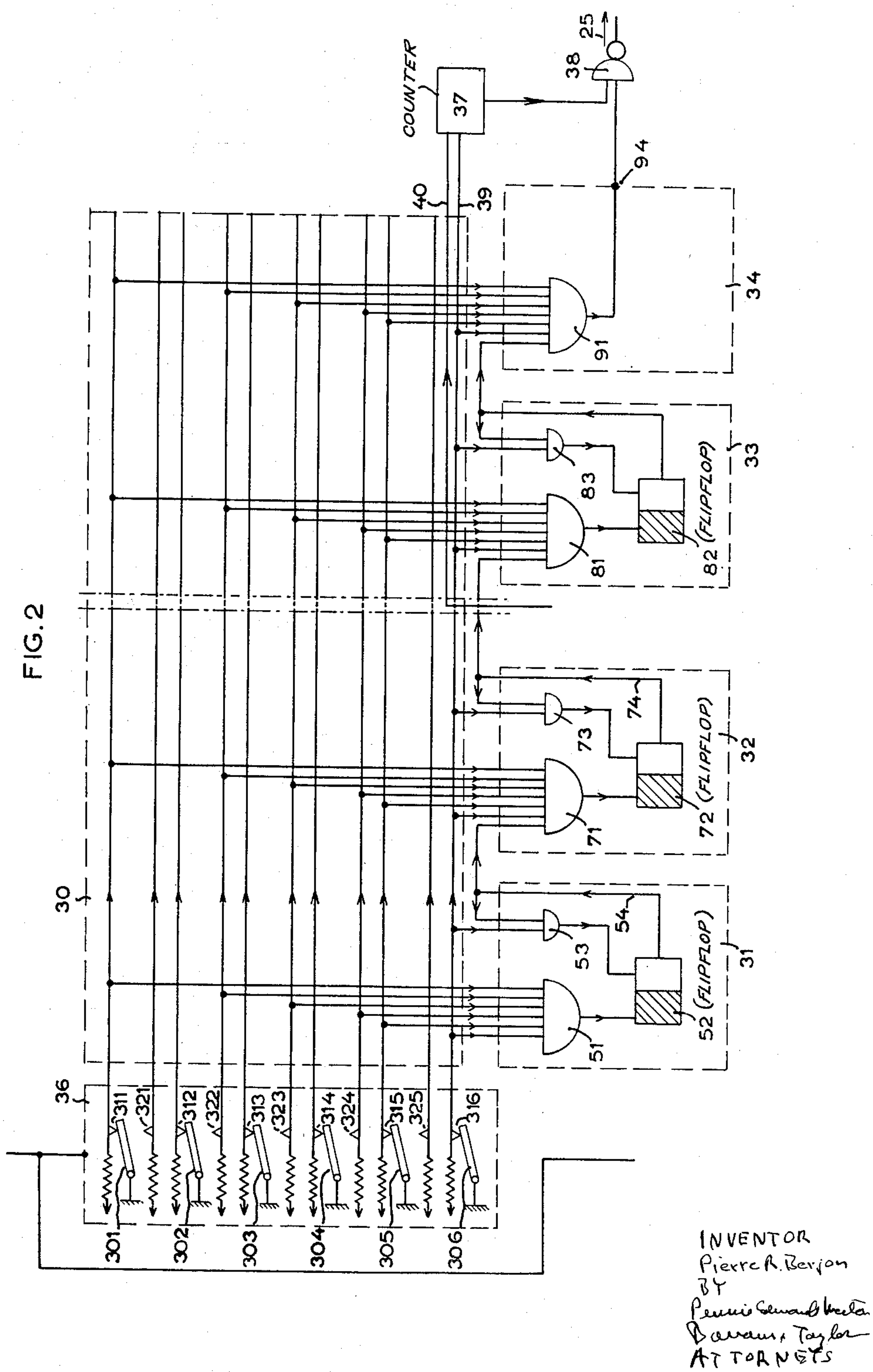
FIG. 2 is a schematic representation of a group signal detector forming part of the system of FIG. 1.

FIG. 2 shows the first two and last two stages only of a chain of $n$ stages for the detection of a sequence of group of $n$ telegraphic characters.

Let it be supposed that the group to be detected is the four-character group CCCC, and that in the clear it is transmitted according to the start-stop five element code comprising for each character C the combination −++ +−.

The code elements or impulses of each character are physically realized, for testing of the arriving group, by means of connections set up within the matrix 30 on lines coming out of a telegraphic translator 36. The translator comprises five groups of contacts, one for each element of a five-element start-stop code character. There are thus provided the five movable contact blades 301 to 306, the mark contacts 311 to 316 and the space contacts 321 to 326. Each of these five groups is allocated to one of the five code elements or impulses which make up each character of the telegraph signal, the group 301, 311 and 321 being allocated to the first code element, the group 302, 312 and 322 to the second element and so on, with the group 305, 315 and 325 allocated to the fifth code element. The position of each of the blades 301 to 305 corresponds to the polarity of the element, the closing of one of the contacts 311 to 315 signifying a mark polarity, whereas closing of one of the contacts 321 to 325 indicates a space polarity. Additionally, the blade 306 opens from the contact 316 when a character has been set up by the positioning of the blades 301 to 305 so that analysis thereof can be made. After such analysis the contact 306 is closed and remains closed until the blades 301 to 305 have taken up the positions corresponding to the combination of the next succeeding character.

The circuits 32 and 33 and also the intervening circuits not shown (for detection of groups of more than four characters) are similar to the circuit 31 and differ therefrom only in the dependence of their gates such as gates 71 and 81 on the flip-flops or Eccles Jordan circuits 52 and 72 of the preceding circuit, the condition of these flip-flops being transmitted out over lines such as 54 and 74. The circuit 34 comprises a gate 91 analogous to the AND gates 51, 71 and 81.

The detector operates as follows: Each gate circuit, such as the circuit 51, is input-connected to one or the other line of each of the pairs of lines which lead respectively to the fixed contact pairs 311 and 321, 312 and 322, 313 and 323, 314 and 324, 315 and 325. The connection is made via five conductors in such a fashion that when the movable contacts 301 to 305 take up positions corresponding to the start-stop code elements of the character which is to be detected in the stage 31 under consideration, potentials of the same sign are applied to the gate 51 by the five conductors. If the stage 31 is to detect the character C whose start-stop code elements are −+++−, the blade 301 makes with contact 321, blades 302, 303 and 304 make respectively with contacts 312, 313 and 314, and blade 305 makes with contact 325. The gate circuit 51 thus receives five negative voltages. When blade 306 breaks with contact 316 a sixth negative voltage is applied to the gate 51. The gate thereupon opens and changes the conduction phase in flip-flop 52 of the circuit 31, "setting" it. A negative voltage is thereupon applied to the gate 71 via line 54. Blade 306 returns to its contact 316 and remains there while the translator 36 translates or sets up the next character. When the latter has been translated, with five negative input voltages to gate 71, the blade 306 again breaks with contact 316, applying a sixth negative voltage to the gate 71, opening it. This negative voltage is also applied to the AND gate 53. Gate 53 opens since flip-flop 52 has been previously transferred. Flip-flop 52 is thus reset. It is thus seen that each stage, when it has detected the character appropriate to it, makes possible opening of the gate in the following stage, and simultaneously restores itself.

When all the $n$ characters of the group have been detected a signal appears at the terminal 94, indicating that the signal group detector has recognized the desired group.

From the foregoing, it will be seen that a control signal is sent to the anomaly signal transmitter by the detector 22 when a certain signal group is not detected at a specified instant. The first head-end message group CCCC being received in the first four stages of the detector of FIG. 2, transfer to the set state the flip-flop of the fourth stage (which stage is not shown in the drawing, but whose flip-flop corresponds to the flip-flops 52, 72 and 82 of the stages shown), initiates via conductor 40 operation of a counter 37 which counts the impulses thereafter appearing on line 39. Line 39 is connected to contact 316 in device 36. When eight pulses corresponding to the five spaces, two carriage returns and a line feed of the second head-end group have been counted, an output pulse is transmitted by the counter 37 and applied to the "AND NOT" gate circuit 38. If at this time there appears no signal at the output 94, there is phase displacement between the ciphering and deciphering tapes and a control signal is sent to the anomaly signal transmitter 25.

Figure 3:
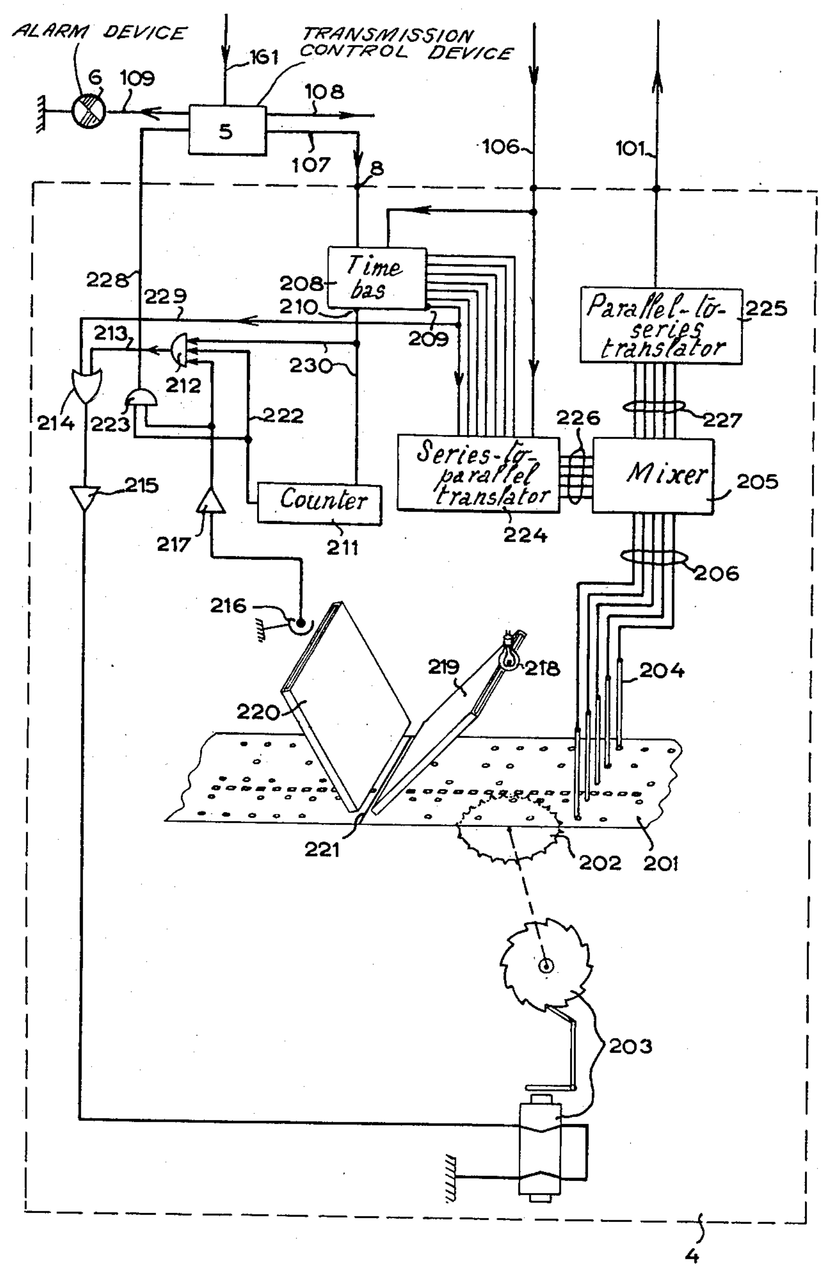
FIG. 3 illustrates apparatus according to the invention for correction of phase displacement between the ciphering and deciphering tapes.

FIG. 3 illustrates the phase correction device for restoration of phase concordance between the tapes of the ciphering device 4 and deciphering device 24.

The tapes in both devices carry reference marks 221 at regular intervals, for example after each 100 characters. Detection of an anomaly signal causes the automatic step by step advance of the tapes until a reference mark thereon is reached, either the first encountered or the second if the first is too close to the instantaneous position of the tape when the anomaly signal occurs. The precaution of moving the tapes to the second reference mark under these conditions is taken in order to prevent a spurious phase correction such as might occur to reset the two tapes with respect to two successive reference marks rather than with respect to the same reference mark on both tapes.

In FIG. 3, 201 identifies the tape for ciphering. As usual, it comprises a longitudinal series of punched holes engaged by the teeth of toothed wheel 202. The wheel 202 is driven by a motor 203. Signal perforations in the tape are scanned by feeler brushes 204 and pulses representing the result of this scanning, i.e., the impulses in start-stop code of the characters on the tape employed for ciphering, are applied in parallel to the mixer 205 via the five conductors 206.

If the signal group WWWW representing an anomaly is detected by the group signal detector 62 (cf. FIG. 1), an anomaly signal is sent from this detector to the control device 5 via the conductor 161 (cf. FIG. 3). The control device 5 retransmits this signal to a plurality of conductors decoupled one from another until it is restored to rest by a stop signal arriving via conductor 228. Via conductor 108 control device 5 stops the automatic transmitter 1 and via conductor 109 it actuates the alarm signal device 6. Further, via conductor 107 it effects position correction of the tape 201 by starting a time base generator 208. This time base generator is normally started by means of start signals which arrive via the conductor 106 from the automatic transmitter 1. When this transmitter is deactivated via conductor 108 the time base is initiated instead via conductor 107.

The time base generator 208 operates in known fashion to supply pulses corresponding to the middle of the start, code and stop elements when it is activated by a start element in a telegraph signal. The pulses corresponding to the middle of the start elements are applied to the output 209. When the time base generator is actuated by the control device 5, it supplies at terminal 210 local signals which may have the same recurrence period such as 150 milliseconds, for example, as those of the pulses at terminal 209. Alternatively, the pulses at terminal 210 may have a shorter recurrence period. In fact, the position correction of the tape may be effected by a step by step motion which is more rapid than that employed in ciphering.

The motor 203 is controlled by pulses developed on a conductor 229 from the start pulses via the OR gate 214 and the amplifier 215 or alternatively by local pulses arriving via conductor 230, AND gate 212, conductor 213, OR gate 214 and amplifier 215.

It will be seen that in the event of an anomaly signal control of the tape 201 by the local pulses is substituted for the normal control by the pulses derived from the start signals.

The reference marks 221 on the tape 201 are read by means of an optical system comprising a light source 219, light conducting channels 219 and 220, and the photocell 216.

When the reference mark 221 is at the intersection of the light channels 219 and 220, the photocell will produce a signal which is amplified in amplifier 217 and applied to AND gate 212. On the other hand the pulses appearing at the terminal 210 are applied to a counter 211 which produces an output signal when a certain number of pulses, twenty for example, have been counted. The output of this counter is connected via conductor 222 to the gate 212. The result is that a control signal is delivered from gate 212 only if a reference mark 221 on the tape appears at the reference position defined by the intersection of the light channels 219 and 220 when simultaneously there is applied to gate 212 a local signal following the twentieth developed since the receipt of the anomaly signal.

The AND gate 223 receives the signal from the cell 216 and that from the counter 211 and delivers via conductor 228 a signal which restores the control device 5 to inactive condition.

In normal operation, "clear" or plain language telegraph signals arrive in surccession on the conductor 106. They are then shifted into parallel by the series-to-parallel translator 224. They are then applied to the mixer 205 which receives via conductors 206 the ciphering elements. The mixer 205 is connected to the parallel-to-series translator 225 via the five conductors 227 and the translator itself is connected to the outgoing transmission line 101.

In FIG. 3 certain of the circuits such as the time base generator, mixer, and series-to-parallel and parallel-to-series translators have been shown in block form since such devices are known in the art. For a full disclosure of the circuits thereof, reference may be had to French Patent No. 1,225,631 filed August 13, 1957 for a ciphering electronic teleprinter in the names of Roger Sourgens and Raymond Chollet and to the French patent of addition No. 73,158 filed February 28, 1958 in the same names.

While the invention has been described herein in terms of a preferred exemplary embodiment, numerous modifications may be made in the structure thus shown and described without departing from the scope of the invention, which is set forth in the appended claims. For example, the signal group CCCC has been described as being detected by the detector 22. As it arrives in clear form it might be detected by the detector 22'.

As already said, start simulators and devices for transmitting groups of characters between the occurence of a trigger signal and a stop signal, often called "Answer-Back devices" are known in the art. A start simulator is for example described in "Teleprinter synchronizing set SYZ-634," by W. Schiebeler, Electrical Communication, No. 4, 1959, page 217 and an answer-back device is described in "Telex in Canada" by C. J. Colombo, Western Union Technical Review, January 1958, vol. 12, No. 1, page 21.

In the description of FIG. 1, it was assumed that signal group detector 2 was responsive to the first head-end signal CCCC and to tail-end signal NNNN, but was irresponsive to the anomaly signal WWWW. Correlatively the transmission of an anomaly at station B for example occurs when switching device 43 connects lines 145 and 144, which takes place when line 102 is idle or transmits clear telegraphic signals. In this case, AND gate 47 is open and the anomaly signal on the one hand allows transmitter 41 to be stopped and on the other hand is transmitted through signal group detector 42, switch 43 in connection state (145–144) and line 102.

It may be desirable that the anomaly signal had not to be long in coming from station B to station A and to await idleness of line 102 or cessation of ciphered transmission. In such a case, signal group detector 42 is allowed to respond to the anomaly signal WWWW as well as to the tail-end signal and to connect lines 145 and 144 upon detection of said anomaly signal. Then the anomaly signal has not to be delayed until switch 43 takes the connection state (145–144) since it controls this state to be taken and line 130 and gate 47 are omitted. Instead of being allowed to transmit from a triggering signal coming through lines 128 and 128' to a stop signal coming through line 130, the anomaly signal transmitter is simply allowed to answer-back from said triggering signal during a predetermined time interval.

I claim:

1. A two-way cipher telegraph communication system employing on-the-line ciphering and comprising at each of two stations separate telegraph signal transmitting and receiving means, means to develop for ciphering and deciphering a sequence of telegraph signals, said sequence being the same at both stations, ciphering and deciphering means operating by combination of said sequence signals with intelligence signals to be enciphered and with said enciphered intelligence signals to be deciphered respectively, means to actuate said ciphering and deciphering means in response to a head-end signal for ciphered messages and to deactivate said ciphering and deciphering means in response to a tail-end signal for ciphered messages, and means to control the generation of said sequence signals at both of said stations, said control means comprising means responsive to incorrect deciphering of a signal for ciphered messages subsequent to said head-end signal to initiate advance to a common reference point of said telegraph signal sequence developing means at both of said stations.

2. A secret telegraph communication system comprising, at each of two stations interconnected by a two-way channel, a telegraph sender, a telegraph receiver, ciphering means insertable in series between said sender and said channel, deciphering means insertable in series between said channel and said receiver, means to develop a sequence of telegraph signals for ciphering and deciphering, anomaly signal generator means, transmitter switch means responsive to a first head-end signal for ciphered messages to insert said ciphering means and responsive to a first tail-end signal for ciphered messages to remove said ciphering means, a receiver switch for removable insertion of said deciphering means, a first receiver detector insertable in series between said receiver switch and said receiver and also between said deciphering means and said receiver, said first receiver detector being responsive to a first head-end signal for ciphered messages in clear form to insert said deciphering means via said receiver switch and responsive to a first tail-end signal for ciphered messages in deciphered form to remove said deciphering means, said first receiver detector energizing said anomaly signal generator at its station in response to the receipt of an improperly deciphered second head-end signal for ciphered messages, a second receiver detector in series between said channel and said receiver switch and responsive to a second tail-end signal for ciphered messages to energize said anomaly signal generator in the event of simultaneous connection of said deciphering means to said first receiver detector via said receiver switch means, and means at each of said stations responsive to the presence of said anomaly signal to restore phase concordance of said telegraph signal sequence developing means with each other.

3. A two-way secret telegraph communication system comprising at each of two stations in series a sender, a transmitted signal group detector, transmitter switching means, a parallel connected ciphering means and transmitter bypass, line and an output line, said system further comprising at each of two stations in series an incoming line, an input received signal group detector, a receiver switching means, deciphering means, an output received signal group detector, and a telegraph receiver, said system further comprising at each of said stations a receiver bypass line between said receiver switching means and output detector, means to develop a common sequence of telegraph signals for use in ciphering and deciphering an anomaly transmitter connectable to the outgoing line of its station in place of the sender of that station, means responsive to the operation of the anomaly transmitter to advance said sequence signal developing means at the station of said operating anomaly transmitter to a reference position and means responsive to the reception of an anomaly signal to disable the sender at the station of reception of said anomaly signal and to advance the sequence signal developing means at said station to a reference position, said transmitted signal group detector responding to first head-end and tail-end signal groups respectively to couple said ciphering device and transmitter by-pass line respectively between the transmitter switching means and outgoing line, said output received signal group detector responding to said first head-end and tail-end signals respectively to couple said deciphering device and receiver by-pass line respectively between the receiver switching means and output received signal group detector, said output received signal group detector responding to an incorrectly decoded second head-end group signal to energize its associated anomaly transmitter and said input received signal group detector responding to a second tail-end group signal in the absence of disconnection of said deciphering means to energize its associated anomaly transmitter.

4. A two-way cipher telegraph communication system employing on the line ciphering and comprising at each of two stations separate telegraph signal transmitting and receiving means, means to develop for ciphering and deciphering a sequence of telegraph signals, said sequence being the same at both stations, ciphering and deciphering means, switching means to actuate said ciphering and deciphering means in response to a first message head-end signal and to deactivate said switching means in response to a first tail-end signal, an anomaly signal transmitter, means to activate said anomaly transmitter in response to improper deciphering of a second head-end signal and also in response to improper deciphering of said first tail-end signal, and means responsive to operation of said anomaly signal transmitter at either of said stations to restore phase concordance between said telegraph signal sequence developing means at both of said stations.

References Cited by the Examiner

UNITED STATES PATENTS

| | | | |
|---|---|---|---|
| 2,456,733 | 12/48 | Potts | 178—22 |
| 2,690,475 | 9/54 | Gaul | 178—22 |
| 2,897,268 | 7/59 | Bacon | 178—22 |

ROBERT H. ROSE, *Primary Examiner.*

E. JAMES SAX, *Examiner.*